106. COMPOSITIONS, COATING OR PLASTIC.

Patented Nov. 1, 1932

1,885,731

UNITED STATES PATENT OFFICE

CHARLES E. KRAUS, OF BROOKLYN, NEW YORK, ASSIGNOR TO SIALCO, INCORPORATED, A CORPORATION OF NEW YORK

PLASTICIZING HYDRAULIC CEMENT

No Drawing. Application filed February 23, 1923, Serial No. 620,830. Renewed December 19, 1930.

This invention relates to improvements in hydraulic cements or mortars such for instance as Portland cement, plaster of Paris, lime mortars, etc., and it also relates to improvement of substances from which such cements or mortars are formed, as for instance hydrated lime.

It is the main object of the present invention to improve the plasticity, working qualities, spread, drying strength and capacity for carrying inert non-setting matter, of the materials as indicated.

Other and ancillary objects of the invention will appear hereinafter.

In carrying out the invention I employ a highly colloidal earth such as bentonite, ehrenbergite, damonterolite or montmorillonite or other minerals so treated as to assume a colloidal or jelly-like form, the earths named consisting in the greater part of colloidal matter and containing a percentage of such matter far in excess of ordinary clays or earths. Other earths containing a sufficient amount of colloidal matter might be employed.

With regard to hydrated lime it is well known that the high calcium lime does not possess the smooth working qualities, plasticity, spread &c., that the high magnesia lime possesses so that the high calcium lime is restricted in its uses and is unsatisfactory in many cases. By the present method the high calcium lime is improved in plasticity, working qualities, spread, drying strength and carrying capacity for inert non-setting matter so that the high calcium lime may be used with as great satisfaction as the high magnesia lime, and the high magnesia lime itself may be improved in the properties indicated by the process. A remarkable feature of the invention is the small percentage of colloidal earth required to produce the results. The colloidal earth such as bentonite may be added to the lime after it has passed the calcining furnace and during the process of hydration or after the lime has been hydrated and ground, or to the quick lime as it leaves the furnace and before hydration. In the case of mixing the colloidal earth with the lime during the process of hydration, the colloidal earth is first mixed with water or alkaline solution such as a saturated lime water solution and then added to the quick lime during the process of hydration. Where the ingredients are mixed dry the bentonite is reduced to a powdered condition and added to the hydrated lime or the quick lime before hydration, with which it is thoroughly mixed so as to produce a substantially homogeneous mass. The bentonite has the capacity for absorbing many times its weight of water so that if the ingredients are mixed dry the water added will be absorbed to a large extent by the bentonite thereby depriving the settable material of water required for crystallization and so retard the setting and furthermore when the material dries out the shrinkage is liable to cause distortion and cracking.

I have discovered that these disadvantages of the bentonite may be greatly reduced, if not entirely avoided, by treating the bentonite before or after it is added to the lime or other settable material so that the capacity of the bentonite for absorbing water is greatly reduced, and it is caused to be in a hydrated condition but occupying much less space than is occupied by the normally hydrated bentonite. This condition of the bentonite is brought by adding some substance such as an acid or an alkali to a mixture of the bentonite and water whereby the bentonite will be precipitated in a flocculent mass. This flocculated mass of bentonite which is precipitated contains a certain degree of water but much less than would be normally absorbed by the bentonite when mixed with water, and apparently this precipitated bentonite has no further capacity for absorbing water and the mass of this precipitated bentonite is less than one-third of the volume of the normally hydrated bentonite.

This action of precipitating the bentonite out of solution as described and thus bringing it into the condition of reduced capacity for water absorption and reduced volume on hydration I term herein as "flocculating" the bentonite. The "flocculating" of the bentonite having been accomplished in a solution separate from the lime, the whole mixture may be poured into the lime during the hydration when the flocculated matter will function to improve the mixture as before referred to while the remainder of the solution will simply add water to the ingredients. At any stage of the proceeding, however, where it is desired to add the flocculated material this may be accomplished not only by previously effecting the flocculation as just referred to but the bentonite may be added to the mixture either dry or powdered or previously hydrated and then the alkaline or acid precipitating or flocculating reagent added to the mixture with sufficient water to produce the desired results, or the flocculating reagent may be contained in the mixture so that it is unnecessary to add it. The flocculating reagent then performs the flocculating functions in the mixture instead of the bentonite being added after the flocculating operation has been performed. Good results have been obtained by the following:

Saturated lime solution, bentonite and hydrated high calcium lime are employed in the proportions of 75 c. c. of saturated lime water solution 2 grams of bentonite and 98 grams of hydrated high calcium lime, the bentonite and lime solution being mixed together and flocculation or precipitation allowed to occur and then the mixture of lime water and bentonite is added to the hydrated high calcium lime and the mixture may then be employed for any of the uses to which hydrated lime may be put.

In regard to the Portland cement, plaster of Paris, lime mortars and other similar material, their setting strength, plasticity, working qualities and capacity for carrying inert non-setting matter, such as gravel, sand, clinker, &c., may be improved by the colloidal plasticizing minerals above referred to and by a treatment similar to that noted in connection with lime. The bentonite or other colloidal earth may be added to the cement either in powdered form or mixed with water, the ingredients being thoroughly mixed so that the mass may be as nearly homogeneous as possible or colloidal earth may be subjected to flocculation as before described, as for instance by employing an alkaline solution such as a solution of caustic soda or sodium silicate. Where the ingredients are mixed in a dry condition the bentonite or other colloidal substance is reduced to a powdered condition and added to the hydraulic cement or other material after it has left the calcining furnace either before the material is ground or after. Where the colloidal earth is added to the hydraulic cements or other materials in a moist condition, the bentonite or other highly colloidal earth is mixed with the water but, where desired, with the flocculating solution and added to the cement at the time of making it ready for use. Also the flocculating of the bentonite or other colloidal earth may be brought about after the bentonite has been mixed with the hydraulic cement by adding the flocculating reagent to the mixture of bentonite with the material to be plasticized.

While the addition of bentonite or similar colloidal earth is to advantage above indicated, it has been found that if the percentage of bentonite or other colloidal earth in the mixture exceeds ten per cent of the cements the action is not beneficial but deleterious.

Good results have been obtained by the following:

Saturated lime solution, bentonite and Portland cement have been employed in the proportions of 30 c. c. saturated solution of lime water 2 grams of bentonite, 98 grams of Portland cement, the lime water and bentonite being first mixed together and flocculation or precipitation allowed to occur and they are then added to the Portland cement which may be employed in any of the ways in which such material is used.

Good results have been obtained in the use of plaster of Paris by employing saturated lime water solution, bentonite and plaster of Paris in proportions of 45 c. c. of lime water 2 grams of bentonite and 98 grams of plaster of Paris, the lime water and bentonite being first mixed together and precipitation allowed to take place after which the mixture is added to the plaster of Paris which may then be used in any of the various ways. Other mixtures may be formed in the various ways as indicated above to fulfill the requirements of each particular case as will be apparent to those skilled in the art.

While the invention has been illustrated in what are considered its best applications it may be varied in these details from the examples given and so is not limited to the details of the illustrative examples recited.

What I claim is:

1. A reagent for cements and plasters, consisting of flocculated bentonite in an alkaline solution.

2. A reagent for cements and plasters, consisting of flocculated bentonite.

3. A reagent for cements and plasters, consisting of a mass of bentonite precipitated from an emulsion.

4. A reagent for cements and plasters, consisting of a mass of bentonite and a flocculating agent.

5. A reagent for cements and plasters, consisting of a mass of colloidal earth and a flocculating agent.

6. A hydrating reagent for cements and plasters, consisting of bentonite and water, together with a flocculating agent.

7. The method of plasticizing cement compounds which consists in adding to the substantially dry cement a mass of flocculated bentonite.

8. The method of plasticizing cement compounds which consists in adding to the substantially dry cement a mass of flocculated colloidal earth.

9. The method of plasticizing cement compounds which consists in adding to the substantially dry cement a mass of bentonite and a flocculating agent.

10. The method of plasticizing cement compounds which consists in adding to the substantially dry cement a mass of colloidal earth, and a flocculating agent.

11. A mixture containing hydraulic cement and flocculated bentonite.

12. A mixture containing Portland cement and flocculated bentonite.

In testimony whereof I have signed this specification this 21st day of February 1923.

CHARLES E. KRAUS.